Sept. 21, 1937.   J. W. FORDYCE   2,093,832
PORTABLE CINEMATOGRAPH APPARATUS
Filed Nov. 6, 1935   4 Sheets-Sheet 1

INVENTOR
J. W. Fordyce.
BY
Lacey & Lacey
ATTORNEY.

Sept. 21, 1937.   J. W. FORDYCE   2,093,832
PORTABLE CINEMATOGRAPH APPARATUS
Filed Nov. 6, 1935   4 Sheets-Sheet 2
Fig. 2.
Fig. 4.
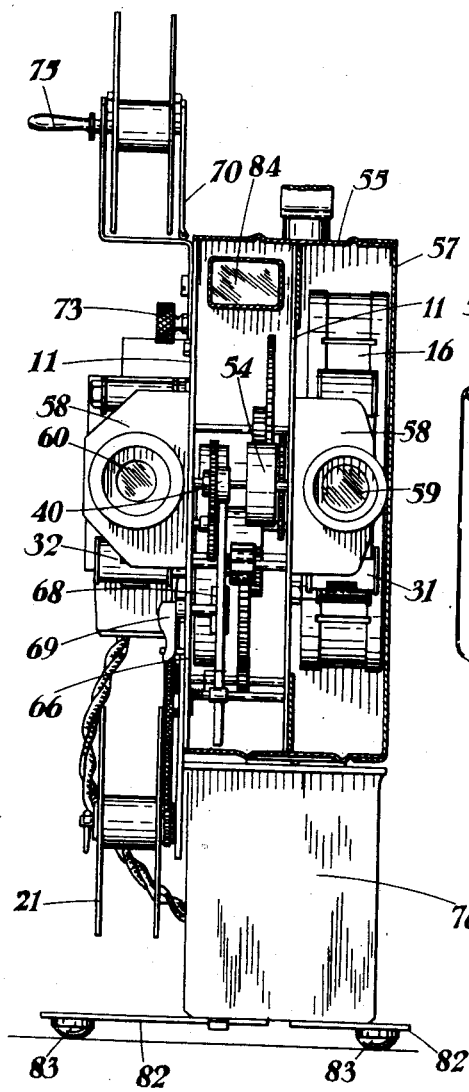
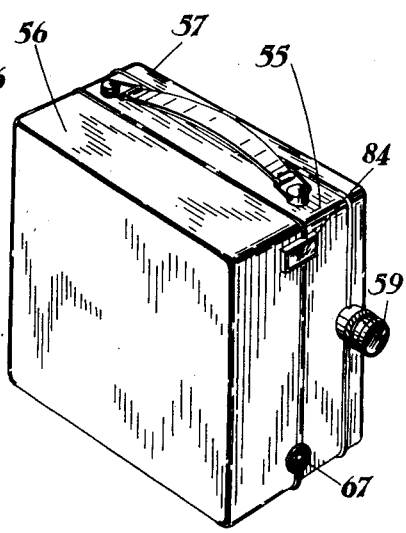
INVENTOR
J. W. Fordyce.
BY
Lacey & Lacey,
ATTORNEYS Sept. 21, 1937.  J. W. FORDYCE  2,093,832
PORTABLE CINEMATOGRAPH APPARATUS
Filed Nov. 6, 1935  4 Sheets-Sheet 3

INVENTOR
J. W. Fordyce.
BY
Lacy & Lacy, ATTORNEYS

Sept. 21, 1937.   J. W. FORDYCE   2,093,832
PORTABLE CINEMATOGRAPH APPARATUS
Filed Nov. 6, 1935   4 Sheets-Sheet 4
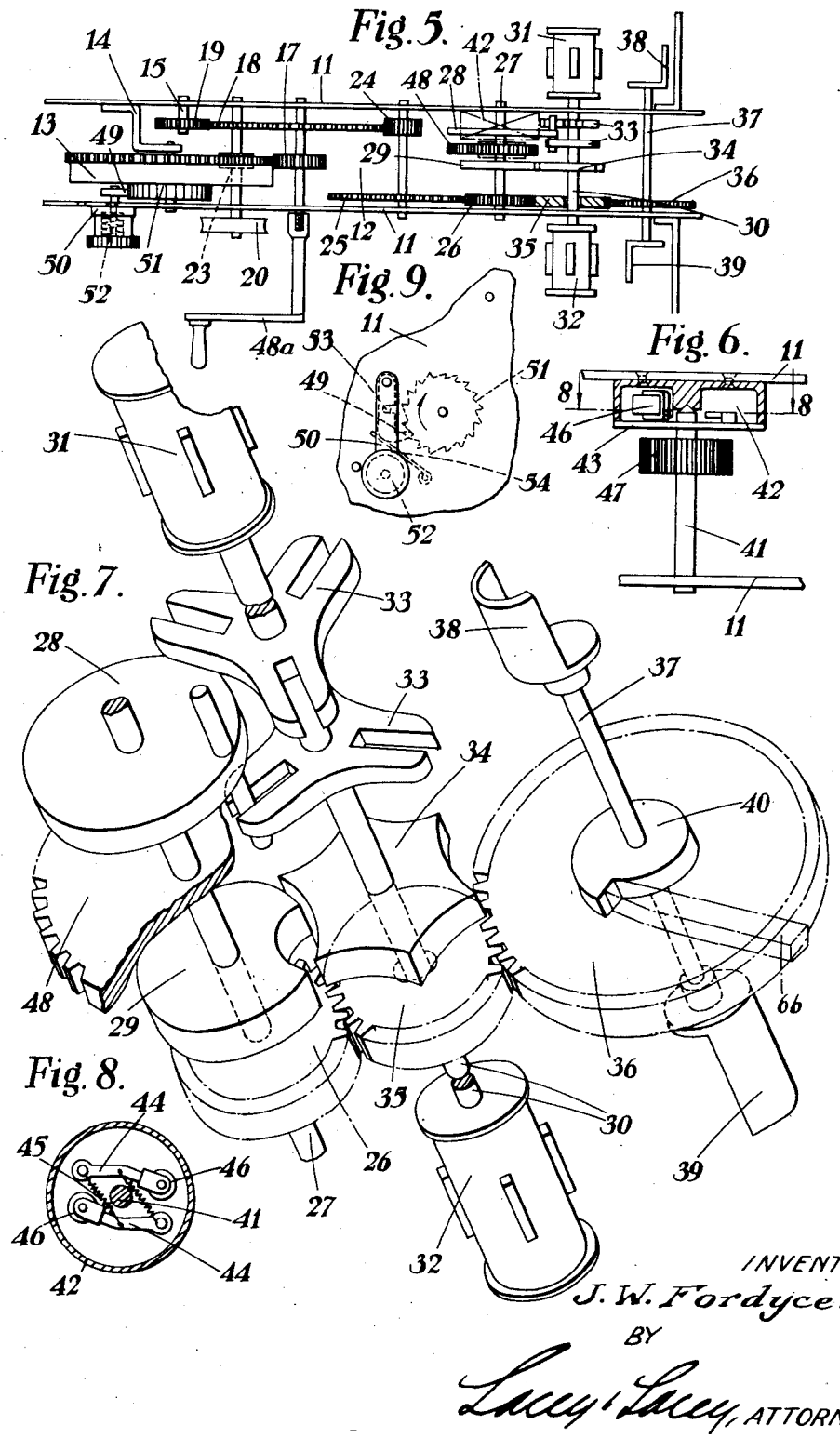

Patented Sept. 21, 1937

2,093,832

UNITED STATES PATENT OFFICE 2,093,832

PORTABLE CINEMATOGRAPH APPARATUS

John William Fordyce, London, England, assignor to United Cine-Camera, Limited, London, England Application November 6, 1935, Serial No. 48,586
In Great Britain November 6, 1934

2 Claims. (Cl. 88—17)

This invention relates to portable cinematograph apparatus, more particularly of the miniature type and has for an object to provide an improved combined instrument, for use, at will, either as a camera or as a projector.

According to the invention a portable cinematograph apparatus has a camera portion comprising a gate and associated shutter and means for passing a light-sensitive film through said gate for taking cinematograph photographs, a projector portion comprising a gate and associated shutter and means for passing a positive film through said gate for projecting cinematograph images, and, a common drive for imparting motion to the shutters simultaneously and to the film passing means simultaneously of the camera and projector portions, respectively, of the apparatus.

Preferably, the camera and projector portions are located at opposite sides, respectively, of the common drive; film engaging drive sprockets for passing films through the camera and projector gates being fast on a shaft which is driven intermittently, and the camera and projector shutters being fast on another shaft which is driven continuously.

The common drive may be carried by and between two flat plates disposed face to face in spaced relationship, the one plate carrying the camera portion and the other plate carrying the projector portion of the apparatus.

Figure 1:
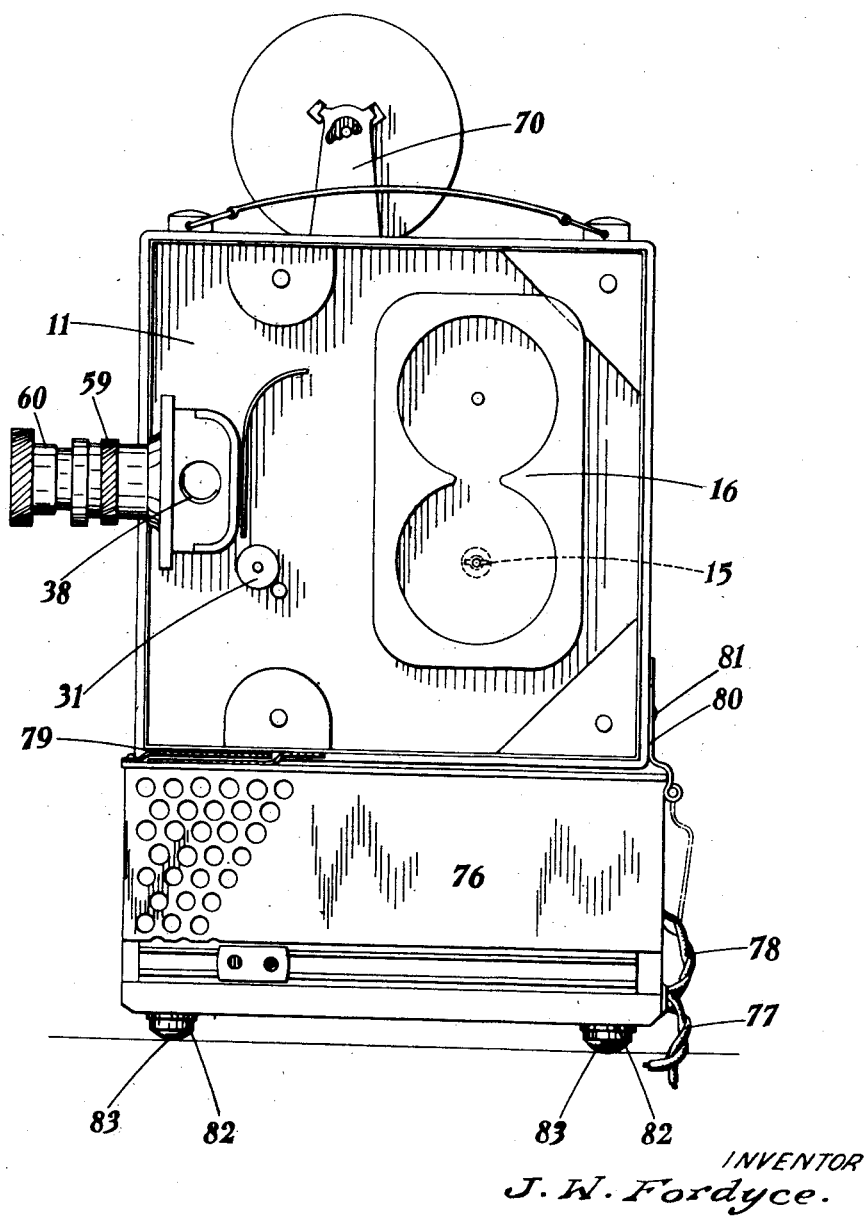
Figure 3:
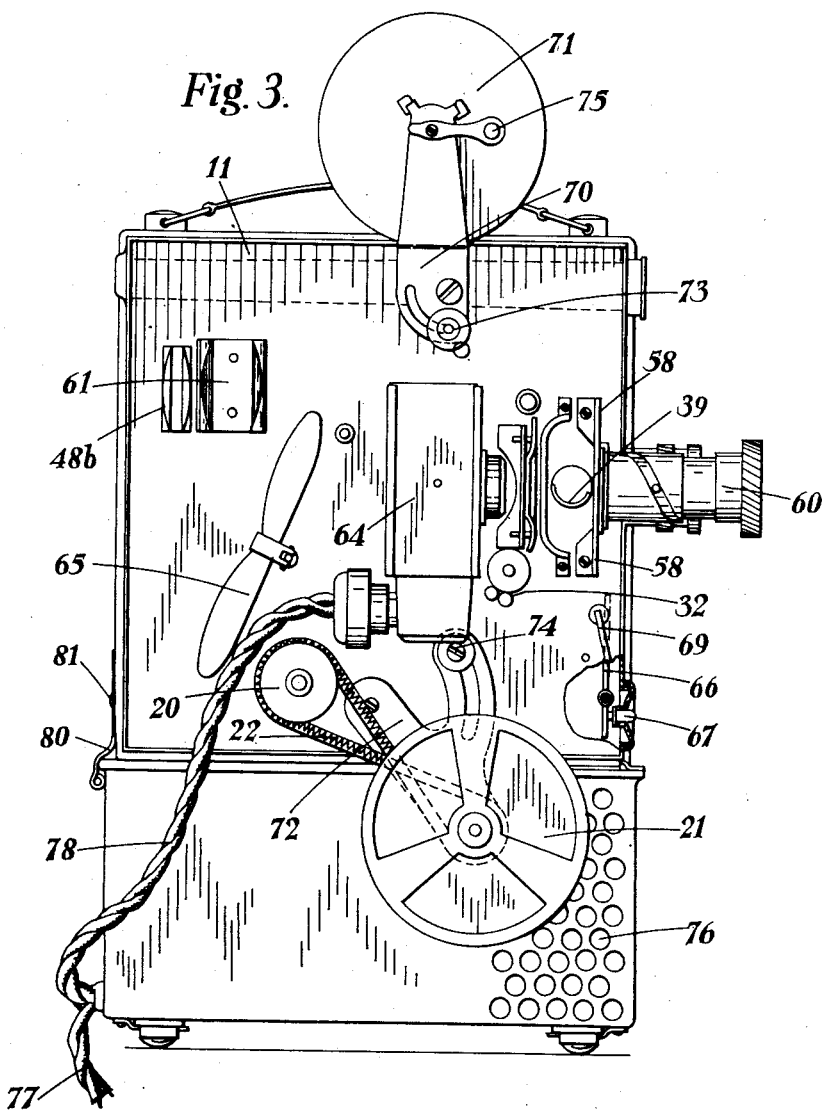

An apparatus according to one form of the invention is illustrated by the accompanying drawings, of which Figures 1, 2 and 3, show the device in elevation mounted upon an associated support and with covers removed, as viewed from one side, from the front, and from the other side, respectively;
Figure 4 is a perspective view of the device with the covers in position drawn to a reduced scale;
Figure 5 is a diagrammatic plan view of what may be termed the "chassis" of the device; Figures 6 and 7 are plan and perspective views drawn to an enlarged scale of parts shown in Figure 5;
Figure 8 is a section on the line 8—8 of Figure 6; and Figure 9 shows in side elevation parts shown in Figure 5.

The working parts of the apparatus illustrated are assembled upon a "chassis" (see Figure 5) comprising two rigid plates 11, 11 mounted in fixed spaced relationship and constituting the usual spindle carrier for a common clockwork drive, indicated generally at 12, located therebetween. The usual spring drum of the clockwork is indicated at 13 and at one side is supported by a bracket 14 to provide space for a co-axial spindle 15 for imparting rotation to a receiving spool of a so-called daylight loader 16 (Figure 1) at the taking or "camera" side of the chassis and which is coupled with said drum 13 by a gear train 13, 17, 18, 19. A pulley 20 whereby motion is imparted to a receiving spool 21 (Figure 3) via an endless flexible spring 22 at the projection side of the chassis is rotatable as one with a gear wheel 23 meshing directly with the spring drum 13. In addition to imparting a drive to the spindle 15 and the pulley 20 the spring drum 13 drives, through gear wheels 17, 18, 24, 25 and 26, a spindle 27 upon which is fast a two pin driving member 28 and a "stop" member 29 of a Geneva mechanism whereby intermittent motion is imparted to a spindle 30 carrying the film engaging and drive sprockets 31, 32 of the taking and projecting means, respectively, and having fast thereon two slotted driven members 33 and a Geneva stop wheel 34. In operation, a pin of the driving member 28 enters a slot of the corresponding driven member 33 and simultaneously the resulting rotation of the spindle 30 causes a point of the stop wheel 34 to enter the notch in the stop member 29, until as the pin on the driving member 28 leaves the slot in the corresponding driven member 33 the stop member and stop wheel once more coact to prevent rotation of the spindle 30. The spindle 27 is in geared connection with a further spindle 37 via a gear wheel 26 fast on the spindle 27, an intermediate or idle wheel 35 loose on the spindle 30, and a gear wheel 36 fast on the spindle 37, which latter carries the shutters 38 and 39 of the taking and projecting optical systems, respectively, and also carries a stop member 40. For governing or controlling the speed of operation of the mechanism a spindle 41, journalled at one end in one plate 11 and at the other in a recess at the outer face of a central boss of a cup-like member 42 riveted to the other plate 11, has fast thereon a disc 43 carrying two pivotally mounted arms 44 drawn together by springs 45 and weighted at their free ends by heavy rollers 46, these latter parts being enclosed by the cup-like member 42 and the disc 43 which carries them. The spindle 41 has also fast thereon a gear wheel 47 which meshes with a larger gear wheel 48 on the spindle 27 so that the spindle 41 is driven at high speed. In operation, as speed increases the arms 44 move outwardly against the springs 45 so that the "flywheel effect" increases in proportion. Normally the heavy rollers 46 weighting the arms 44 are clear of the inner peripheral surface of the member 42, but are in the form of rollers so as to induce a minimum of friction should they come into contact with the inner periphery of the member 42, e. g., in the event of "over driving" of the device.

In order that the apparatus may be driven by hand the spindle of the wheel 17 is extended at one end to take a detachable handle 48a, which, when out of use, is normally carried by a spring clip 48b, and means are provided for permitting the drum 13 to be rotated by the handle (with the spring therein slack) during hand operation. Except during hand operation, a pawl 49 (see Figure 9) mounted on one side plate 11 about a common axis with a hand lever 50 engages a ratchet wheel 51 fast on the drum 13. The hand lever 50 has a spring influenced plunger 52 at one end, and, intermediately of its length, carries a pin 53 which co-operates with the pawl 49 to limit movement of the latter under the influence of a spring 54. For hand operation, the plunger 52 is withdrawn from an aperture in the corresponding plate 11 and the lever 50 is moved in a clockwise direction carrying the pawl 49 out of engagement with the ratchet wheel 51 and the spring plunger is engaged with another aperture in the plate 11 maintaining the pawl 49 disengaged.

The chassis is mounted within the central part, or section, 55 of a three section, sheet metal casing, 55, 56, and 57, which, as will be clearly seen from the drawings, projects some distance from the plate 11 at the taking side of the chassis, but not at all from the other plate 11; the outer parts 56 and 57 of the casing being in the form of covers. The plates 11 have lateral extensions 58 for carrying the lenses of taking and projecting optical systems which are indicated at 59 and 60, respectively. The lens 59 remains permanently in position and the central part 55 of the casing is formed with an aperture to accommodate it. The lens 60, however, is detachably mounted upon the corresponding lateral extension 58 and can only be placed in position thereon when the cover 56 is removed; a clip 61 being mounted upon the corresponding plate 11 to carry the lens 60 when the device is not in use for projection. Detachable covers (not shown) may be provided for enclosing the shutters 38 and 39.

At the projection side of the chassis (see Figure 3), there is provided behind a lamp housing 64 a winding handle 65; and, for controlling the operation of the common drive 12, the above-mentioned stop 40 on the shutter spindle 37 co-operates, when the device is not in use, with the upper end of a spring influenced lever 66 (see Figures 2, 3, and 7) which may be moved clear of the stop 40 for taking purposes by means of a push button 67 (Figures 3 and 4) and for projecting purposes may be maintained clear of the stop 40 by turning a cam member 68 through substantially a right-angle by means of a lever 69 (Figures 2 and 3) secured to the spindle of said cam member 68. At the upper part of the plate 11 on the projecting side of the device is pivotally mounted a support 70 for a spool 71 containing a film from which images are to be projected, and at the lower part of said plate 11 is pivotally mounted a support 72 for the already mentioned spool 21 for receiving films; thumb nuts 73 and 74 being provided for securing the supports either in their extended positions for use or in their folded positions in which they lie within the confines of the casing parts 55 and 56. The support 70 has a handle 75 for rewinding projected films.

When in use for projection the device with the cover 56 removed and the lens 60 in position is mounted upon a box 76 containing the usual electrical resistances required for controlling the supply of current to the lamp (not shown) in the lamp housing 64; two sets of flexible leads being provided, one 77 for connection with the source of supply (not shown) and the other 78 for detachable connection with the lamp housing 64. For securing the device firmly in position upon the box 76 a tongue 79 extending rearwardly from the forward part of the box 76 is entered into a forwardly directed opening in the lower wall of the centre part 55 of the casing, and a hasp 80 at the rear part of the box 76 is swung upwardly to engage a headed stud 81 at the rear of said casing part 55. The box at its underside is provided with laterally extending arms 82 carrying feet 83 at their outer ends.

The central part 55 of the casing carries a view finder 84 which is placed in position after the chassis has been located therewithin.

What I claim to be new is:

1. Apparatus of the class described including a casing, a chassis carried therein and having plates, a gear train carried by the chassis between the plates, clockwork mechanism carried by the chassis and adapted to drive the gear train, camera mechanism carried in the casing at one side of the chassis and including a shutter spindle having a shutter, a driving spindle for said camera mechanism, means operatively connecting the shutter spindle with the driving spindle, a cam carried by the shutter spindle, a lever carried by the casing and operative for engaging the cam and locking the shutter spindle, and means for transmitting intermittent rotative movement from the clockwork mechanism to the driving spindle.

2. Apparatus of the class described including a casing, a chassis mounted therein, a gear train carried by the chassis and including clockwork mechanism adapted to drive said gear train, camera mechanism carried in the casing at one side of the chassis and including a shutter spindle having a shutter, projector mechanism carried in the casing at the other side of the chassis, a driving spindle for said camera mechanism and said projector mechanism, said shutter spindle having a shutter for said projector mechanism, means operatively connecting the shutter spindle with the driving spindle, a cam carried by the shutter spindle, a lever carried by the casing and engageable with the cam, a push button carried by the casing and adapted for rocking the lever clear of the cam during a picture-taking operation, said lever engaging the cam during a projecting operation, and means for transmitting intermittent rotative movement from the clockwork mechanism to the driving spindle.

JOHN WILLIAM FORDYCE.